July 31, 1951 W. J. KRUEGER 2,562,620
BUMPER AND FENDER CONSTRUCTION
Filed Nov. 9, 1946 2 Sheets-Sheet 1
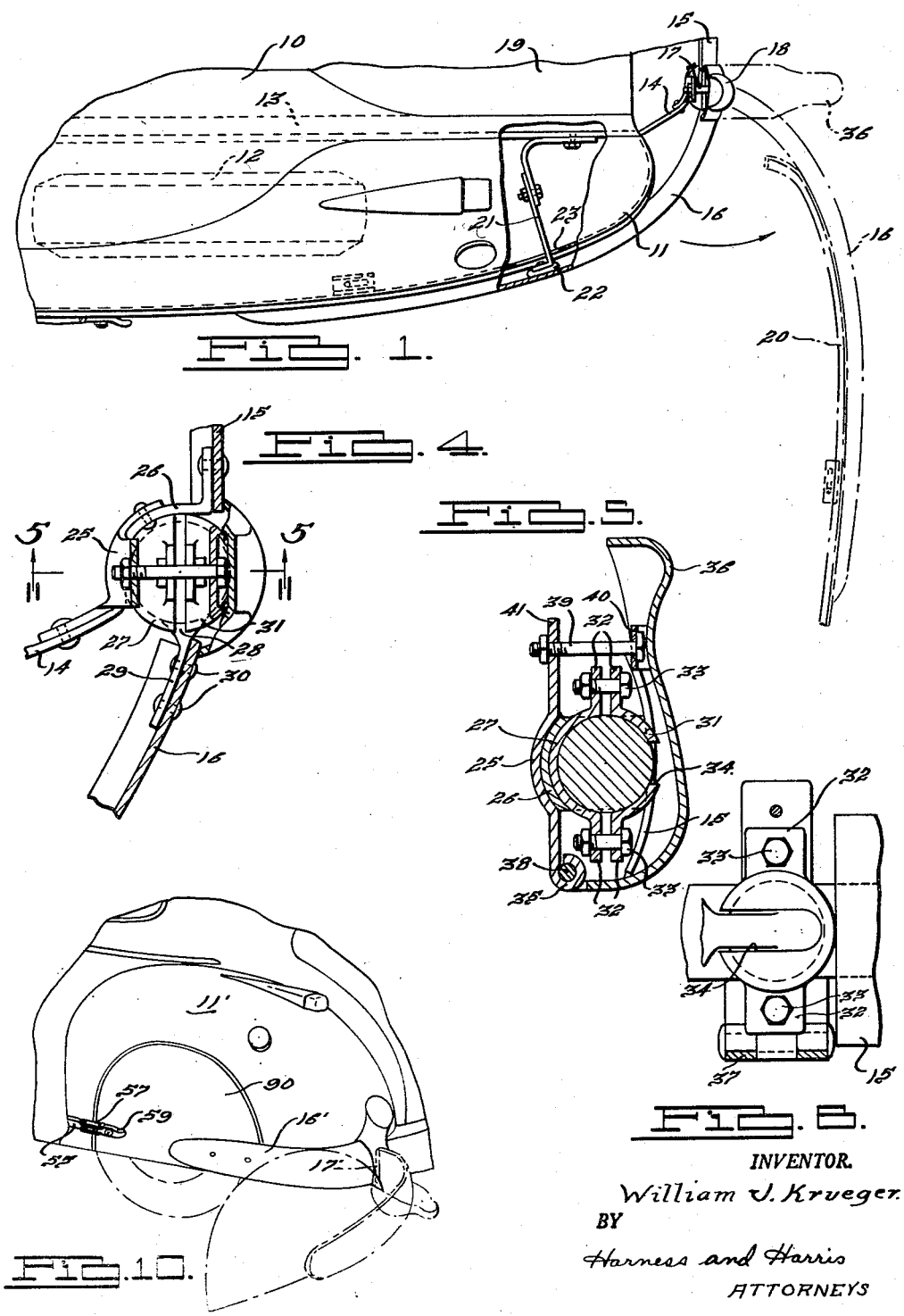
INVENTOR.
William J. Krueger
BY
Harness and Harris
ATTORNEYS

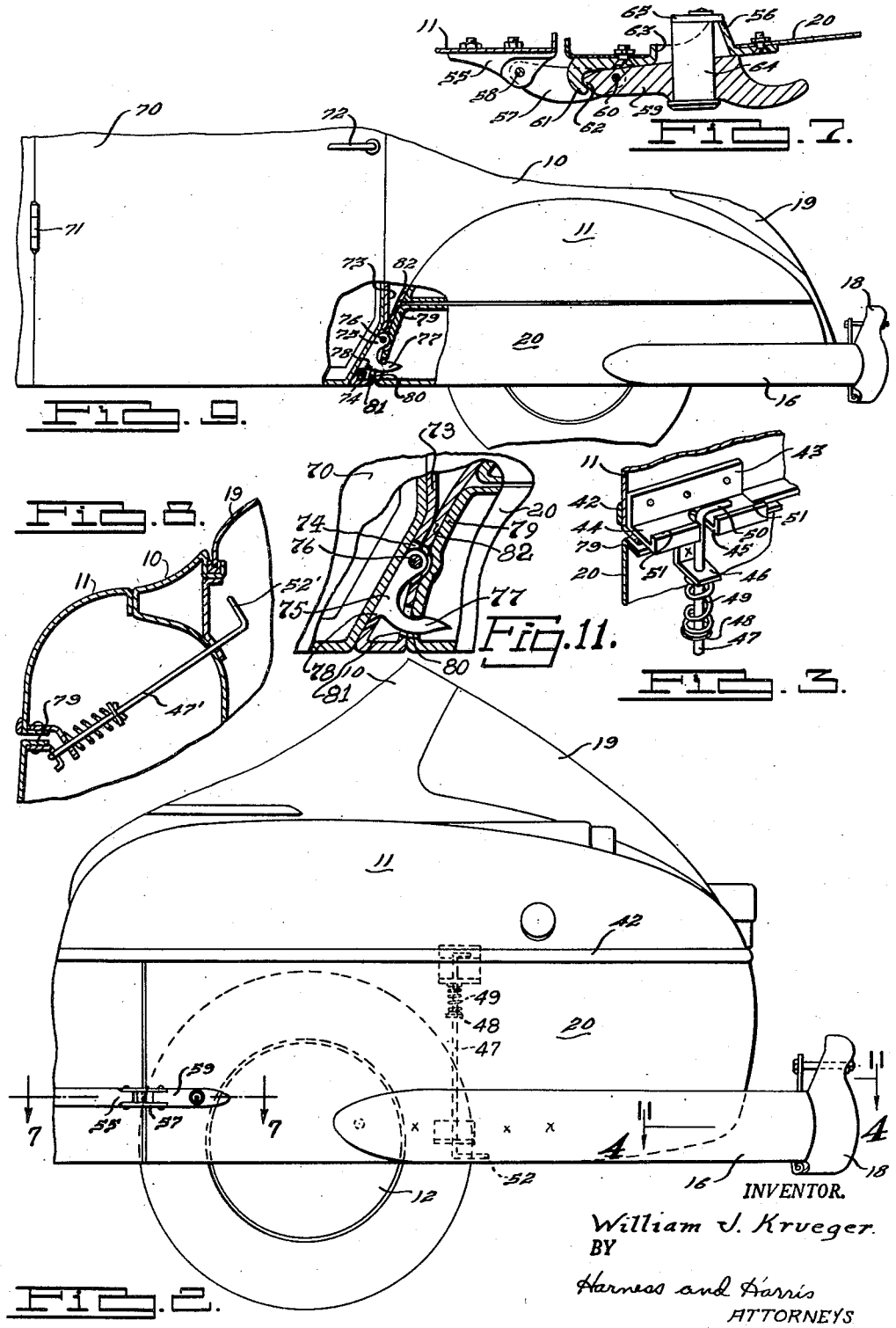

Patented July 31, 1951

2,562,620

UNITED STATES PATENT OFFICE 2,562,620

BUMPER AND FENDER CONSTRUCTION

William J. Krueger, Ferndale, Mich., assignor to Chrysler Corporation, Highland Park, Mich., a corporation of Delaware Application November 9, 1946, Serial No. 709,045

2 Claims. (Cl. 293—62)

This invention relates to vehicle construction and more particularly to a movable wheel covering panel combined with a rotatable bumper portion extending longitudinally of the vehicle.

In the manufacture of automobiles various means have been utilized to compromise between the necessity of providing an opening in the exterior surface of the vehicle through which the vehicle wheel may be removed and the desire to conceal or minimize such an opening so that it does not interrupt the contour of the vehicle. Heretofore fender shields have been provided to cover such an opening and various means have been utilized to secure the fender shield to the fender. It has been found that these means are usually on the inner side of the fender where they are exposed to road dirt and they are, therefore, difficult to release manually and unreliable as a securing means.

Recently the trend of automobile design has provided bumpers nominally referred to as wraparound bumpers which are provided with end portions which extend longitudinally of the vehicle. Great difficulty and expense have been incurred in forming these U-shaped bumpers.

It is an object of my invention to provide a bumper having the general appearance of these wrap-around bumpers which has the end portions thereof pivotally connected to the lateral bumper portion and to secure this end portion to a movable panel adjacent the vehicle wheel. By this construction the cost of manufacture of the bumper is decreased and a pivotal mounting is provided for a panel adapted to cover a portion of the wheel. The body contour is thus preserved without interruption and means are provided by which the wheel may be removed from the vehicle and the cost of construction lessened.

It is a further object of my invention to provide a removable wheel covering panel which is permanently secured to the vehicle by means of the pivotal support of the bumper extension on the lateral bumper portion to thereby render theft of the wheel covering panel impossible. An additional object of the invention is to provide a means by which the removable panel may be locked in its closed position and theft of the vehicle wheel prevented. Supplemental locking means may be provided or releasing means provided which are dependent upon actuation from within a lockable compartment of the vehicle.

It is a further object of my invention to provide a novel rotatable connection between the lateral bumper portion and the end bumper portions or extensions and to provide means to seal this rotatable connection behind the usual vertical bumper guard.

Referring to the drawings:

Fig. 1 is a plan view of the rear corner of an automobile provided with my invention;

Fig. 2 is an elevation of the Fig. 1 view;

Fig. 3 is a perspective view of a releasable means for providing vertical support to the movable panel;

Fig. 4 is a horizontal section of the rotatable means of supporting the bumper extension on the lateral bumper portion;

Fig. 5 is a section on the line 5—5 of Fig. 4;

Fig. 6 is an elevation of the Fig. 4 rotatable connection with the bumper guard removed;

Fig. 7 is a sectional view taken on the line 7—7 of Fig. 2 and showing one form of lock which may be used to lock the removable panel in its closed position;

Fig. 8 is a vertical section showing a modified construction in which a means supporting the panel has its operative end disposed within the luggage compartment of the vehicle;

Fig. 9 is an elevation partially in section of a vehicle provided with panel locking means which can be actuated only when the vehicle door is opened;

Fig. 10 is a perspective view of a modified vehicle construction employing a conventional fender shield as the removable panel; and Fig. 11 is an enlarged view of the locking means shown in Fig. 9.

In Fig. 1 a portion of an automobile is illustrated as having a body 10, a fender 11, and a road wheel 12. The fender 11 may be a separate article secured to the vehicle body 10 in a conventional manner or it may be formed as an integral portion of the body. In either construction the fender provides a depending surface panel which overhangs the wheel 12 and forms a portion of the side wall or exterior surface of the vehicle. The vehicle frame 13 supports a brace 14 upon which a rear bumper 15 is mounted. The bumper 15 rotatably supports a supplemental bumper portion 16 at 17. The supplemental bumper portion 16 extends in a direction which is generally longitudinal of the vehicle. The usual vertical bumper guard 18 covers the rotatable support 17. A rear deck lid 19 is provided in the vehicle body 10.

A panel 20 is provided for assembly with the fender 11 as illustrated in Fig. 2. The panel 20 is secured as by welding to the supplemental bumper portion 16. Means will be described hereinto to accommodate rotation of the supplemental bumper portion 16 and panel 20 about the point 17 to a position shown in dotted lines in Fig. 1. Movement of the panel 20 and supplemental bumper portion 16 to the dotted line position of Fig. 1 exposes the wheel 12 so that the latter may be removed in the conventional manner. The brace 21 having a padded end portion 22 is supported by the frame 13 and extends generally laterally of the vehicle. The padded end portion 22 is adapted to engage the supplemental bumper portion 16 when the panel 20 is in its closed position. An opening 23 is provided in the panel 20 to permit this engagement. The brace 21 is adapted to provide lateral support to the supplemental bumper portion 16 and to absorb impact applied to the bumper portion 16 laterally of the vehicle.

I have illustrated a form of rotatable connection at the point 17 which is particularly adapted to support the supplemental bumper portion 16 on the bumper 15. Figs. 4, 5, and 6 illustrate this rotatable connection. A stationary bracket 25 is secured to the brace 14 and has an extension 26 which supports the bumper 15. A hemispherical socket portion 27 is welded to the extension 26. A ball 28 has an extension 29 which is riveted at 30 to the supplemental bumper portion 16. The ball 28 is spherical and of a size which permits its reception within the hemispherical socket 27. A cooperating hemispherical socket 31 may then be assembled over the ball 28 and bolted to the hemispherical socket 27. The sockets 27 and 31 are provided with flanges 32 adapted to receive bolts 33 for this purpose. The socket 31 is provided with a horizontal slot 34 in which the extension 29 of ball 28 may move when the ball is rotated within the assembled socket. The supplemental bumper portion 16 and panel 20 which is welded thereto are permanently secured to the vehicle by means of the sockets 27 and 31.

A vertical bumper guard may be provided to conceal the ball and socket connection. The stationary bracket 25 may be provided with a hinge portion 35 preferably adjacent its lower edge as illustrated in Fig. 5. A vertical bumper guard 36 may be provided with a cooperating hinge portion 37 and a hinge pin 38 may be assembled with the hinge portions 35 and 37. The vertical bumper guard 36 has a dished contour adapted to receive the ball and socket connection and to engage the bumper 15 and bumper extension 16 when the latter is in its closed position. Suitable means such as a bolt 39 which is adapted to cooperate with a flange 40 on the bumper guard and a flange 41 on the stationary bracket 25 may be provided to releasably secure the bumper guard in its vertical position. When it is desired to remove the wheel, the bolt 39 may be released and the bumper guard 36 rotated about the hinge pin 38 to expose the ball and socket support so that the supplemental bumper portion 16 and panel 20 may be rotated relative to the bumper 15.

In the Fig. 2 construction the upper edge of the removable panel 20 is illustrated as being located in its closed position adjacent a trim strip 42. Means may be provided to furnish a resilient vertical support to the panel so that it will not sag on the ball and socket connection with the bumper and so that it will not rattle against the fender 11. One form of such a vertical support is illustrated in Figs. 2 and 3. A bracket 43 having a horizontal ledge 44 is secured to the inner side of the fender 11. The ledge 44 is provided with a slot 45 extending laterally of the vehicle. A bracket 46 is welded to the inner side of the panel 20 in cooperating relationship with the bracket 43. An operating rod 47 is supported for rotary and axial movement relative to the bracket 46. An abutment 48 is provided on the rod 47 and a spring 49 is positioned in concentric relationship with rod 47 and in abutting relationship with bracket 46 and abutment 48. The spring 49 reacts against bracket 46 to urge abutment 48 and rod 47 to a downward position. The rod 47 is provided with a bent portion 50 adapted to penetrate the slot 45 and rest upon the ledge 44 of bracket 43. Upturned edges 51 may be provided on ledge 44 to prevent bent portion 50 from slipping off ledge 44. A handle 52 is provided on the lower end of rod 47. In operation when the panel 20 is in its closed position, the operator may lift and rotate handle 52 until the bent portion 50 is seated on the ledge 44. This will lock the panel 20 in its closed position relative to the fender 11 and the spring 49, will through abutment 48, rod 47, and bent portion 50 act to resiliently support the panel 20 against vertical movement relative to the fender 11.

If desired, a similar construction could be provided as illustrated in Fig. 8. In the Fig. 8 construction the rod 47' has the operating handle 52' located within the luggage compartment at the rear of the vehicle. Fig. 8 is a vertical section through the vehicle body and fender. The operation of the handle 52' would be similar to that described with reference to Fig. 3 but it would be necessary to open the trunk lid 19 to obtain access to the handle 52'. Trunk lids are usually provided with a locking means and by this positioning of the parts an effective lock is provided for the panel 20 which would prevent the opening of the panel 20 or the removal of the wheel 12.

Fig. 7 illustrates a lock and overcenter toggle connection which may be secured on the outside of the vehicle to prevent rotation of the panel 20 and supplemental bumper portion 16 about the ball and socket joint. In addition this locking means may be used to apply a horizontal tension to the panel 20 to minimize rattles and to prevent the panel 20 from uncontrolled rotation about the ball and socket connection. A bracket 55 is secured to the fender 11. A bracket 56 is secured to the panel 20. A link 57 is rotatably mounted on bracket 55 at 58. A handle 59 is rotatably mounted on link 57 at 60. The bracket 56 is provided with an extension 61 and the handle 59 is provided with an extension 62. Bracket 56 is also provided with an opening 63. Extension 62 on handle 59 has sufficient length so that the distance from the end of extension 62 to the point 60 is greater than the normal distance of the point 60 from the adjacent edge of the extension 61 of bracket 56. In operation when the panel 20 is in its closed position as illustrated in Fig. 7 the extension 62 of handle 59 may be positioned in engagement with the rear edge of the extension 61 and the handle 59 pushed toward the panel 20. Because of the length of the extension 62 an overcenter relationship has been created and the panel 20 will be drawn toward the fender 11 because of the overcenter relationship, the handle 59 will normally remain in the position adjacent the panel 20. If desired, a lock 64 may be provided on handle 59. An eccentric locking cam 65 may be provided for engagement and disengagement with the bracket 56. The opening 63 will facilitate the entrance of the cam 65 to a position behind the bracket 56.

Figs. 9 and 11 illustrate a modified form of the invention in which releasable means securing the panel to the vehicle body is located within the passenger compartment of the vehicle. A door 70 is hinged to the vehicle body at 71 and provided with the usual handle 72 by which a passenger may gain access to the vehicle. When the door 70 is opened the casing 73 forming the doorway is exposed. The casing 73 is provided with an opening 74 in which a rotatable member 75 is pivotally mounted at 76. The member 75 is provided with a lug portion 77 and a handle portion 78. The panel 20 is provided with a laterally extending lip 79 around its periphery. The lip 79 is provided with an opening 80 which is adapted to receive the lug portion 77 of the member 75. The lug portion 77 of the member 75 penetrates an opening 81 in the body element 82 which forms a wheel housing. The point of contact of the lug portion 77 is located directly below the pivot 76 so that the weight of the panel does not tend to rotate the member 75. In operation when the panel 20 is in its closed position, the handle 78 of the member 75 may be actuated so that the member 75 rotates about the point 76 and the lug 77 penetrates the opening 80 and engages the lip 79 of the panel 20 to lock the panel 20 in its closed position. The member 75 cannot be actuated unless the door 70 is opened. The usual door locking means provided on automotive vehicles prevents the operation of the door 70 by unauthorized persons.

Fig. 10 illustrates in perspective a modified form of the invention wherein the fender 11' has the conventional shape and is adapted to receive a fender skirt 90 which is shaped to conform with the usual fender opening. The supplemental bumper member 16' is secured to the fender skirt 90 by welding or bolts, not shown, and is hinged at 17'. This illustrates the application of the invention to more conservative or conventional body designs. The lock 55, 57, 59 described in Fig. 7, may be used to secure the fender shield in its assembled position.

I claim:

1. In a motor vehicle having a trunk compartment, a lid adapted to open and close said compartment, means to lock said lid in its closed position, a road wheel, a depending side wall provided with an opening adjacent said road wheel and a bumper extending laterally of the vehicle, the combination of a panel detachably associated with said side wall and adapted to cover said opening, an auxiliary bumper unit secured to said panel, hinge means forming a connection between said auxiliary bumper and said bumper whereby said unit may be rotated about said hinge means either into a first position in which said panel closes said opening or into a second position exposing said wheel to said opening, latch means to secure said unit in said first position and a latch operating mechanism operable to actuate said latch means and provided with an operating handle positioned in said trunk compartment whereby said panel may be latched in said first position and said lid locked in its closed position and removal of said wheel is prevented until said lock is operated and said lid is moved to open said compartment to permit actuation of said operating handle.

2. In a motor vehicle having a body provided with a door and a door casing, a road wheel, a depending side wall provided with an opening adjacent said road wheel and a bumper extending laterally of the vehicle, the combination of a panel detachably associated with said side wall and adapted to cover said opening, an auxiliary bumper unit secured to said panel, hinge means forming a connection between said auxiliary bumper and said bumper whereby said unit may be rotated about said hinge means either into a first position in which said panel closes said opening or into a second position exposing said wheel to said opening, latch means located adjacent said door casing and operable to secure said unit in said first position and a latch operating mechanism operable to actuate said latch and provided with an operating handle mounted on said door casing which is accessible when said door is open.

WILLIAM J. KRUEGER.

REFERENCES CITED

The following references are of record in the file of this patent:

UNITED STATES PATENTS

| Number | Name | Date |
| --- | --- | --- |
| 1,780,974 | Hostutler | Nov. 11, 1930 |
| 1,998,134 | Gorman et al. | Apr. 16, 1935 |
| 2,002,832 | Robinson | May 28, 1935 |
| 2,200,253 | Atwood | May 14, 1940 |
| 2,352,421 | Wohlfield | June 27, 1944 |
| 2,379,341 | Craig | June 26, 1945 |
| 2,446,347 | Walkowiak | Aug. 3, 1948 |